United States Patent
Li

(10) Patent No.: US 10,164,514 B2
(45) Date of Patent: Dec. 25, 2018

(54) NON-AUDIBLE CONTROL CIRCUIT FOR A BUCK CONVERTER IN DCM MODE

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/649,236

(22) Filed: Jul. 13, 2017

(65) Prior Publication Data

US 2018/0019671 A1 Jan. 18, 2018

(30) Foreign Application Priority Data

Jul. 13, 2016 (CN) .......................... 2016 1 0548768

(51) Int. Cl.
| | |
|---|---|
| *H02M 1/08* | (2006.01) |
| *H02M 1/44* | (2007.01) |
| *H02M 3/158* | (2006.01) |
| *H02M 3/156* | (2006.01) |
| *H02M 1/00* | (2006.01) |

(52) U.S. Cl.
CPC ............. *H02M 1/083* (2013.01); *H02M 1/44* (2013.01); *H02M 3/156* (2013.01); *H02M 3/1588* (2013.01); *H02M 2001/0038* (2013.01)

(58) Field of Classification Search
CPC ......... H02M 1/038; H02M 2001/0054; H02M 1/083
See application file for complete search history.

(56) References Cited

U.S. PATENT DOCUMENTS

| | | | |
|---|---|---|---|
| 2014/0368174 A1* | 12/2014 | Houston | H02M 3/158 323/271 |
| 2015/0097544 A1* | 4/2015 | Bizjak | H02M 3/156 323/284 |

* cited by examiner

*Primary Examiner* — Kyle J Moody
*Assistant Examiner* — Peter Novak
(74) *Attorney, Agent, or Firm* — Perkins Coie LLP

(57) ABSTRACT

Noise-free control circuit and control method for controlling a switching converter to avoid generating audile noises. The noise-free control circuit has a timer used to set a noise-free frequency threshed. When the switching frequency of the switching converter is decreased to the noise-free frequency threshold, the switching frequency of the switching converter is limited to the noise-free frequency threshold. The noise-free frequency threshold is higher than a maximum audible frequency of an audio noise.

16 Claims, 7 Drawing Sheets

NON-AUDIBLE CONTROL CIRCUIT FOR A BUCK CONVERTER IN DCM MODE

CROSS-REFERENCE TO RELATED APPLICATION

This application claims the benefit of CN application No. 201610548768.1, filed on Jul. 13, 2016, and incorporated herein by reference.

TECHNICAL FIELD

The present invention generally refers to electrical circuit, and more particularly but not exclusively refers to noise-free control circuit and control method for switching converter.

BACKGROUND

It is well known that the audible frequency range of an audio noise that can be heard by human ear is 20 Hz~20 kHZ. In a switching converter, if the switching frequency of the switching converter decreases below 20 kHZ, audio noise will be generated. Thus, how to avoid the audio noise should be considered during the design of the switching converter. Generally, the switching frequency of the switching converter is much higher than 20 kHZ during a normal operation condition. However, when the switching converter operates in a light-load or no-load condition, the switching frequency of the switching converter may be lower than 20 kHZ which may result in occurrence of the audio noise.

Therefore, it is desired to have a solution for avoiding audio noise especially when the switching converter operates in the light-load or no-load condition.

SUMMARY

Embodiments of the present invention are directed to a noise-free control circuit for switching converter having a high-side switch and a low-side switch, comprising: a timer, configured to generate a clock signal having a frequency used as a noise-free frequency threshold; a zero-cross detection circuit, configured to sense an inductor current signal flowing through an output inductor of the switching converter, and further configured to receive a feedback signal to generate a noise-free current threshold, and further configured to compare the inductor current signal with the noise-free current threshold to generate a zero-cross signal; and a frequency controller, configured to receive the feedback signal, the zero-cross signal and the clock signal to generate a high-side control signal and a low-side control signal to respectively control the high-side switch and the low-side switch, wherein when a switching frequency of the switching converter is decreased to the noise-free frequency threshold, the frequency controller is configured to limit the switching frequency to the noise-free frequency threshold based on the clock signal, and wherein when the inductor current signal is reversely increased to the noise-free current threshold, the frequency controller is configured to turn the low-side switch off based on the zero-cross signal.

Embodiments of the present invention are directed to a noise-free switching converter, comprising: a switching circuit, comprising a high-side switch, a low-side switch and an output inductor, wherein an input voltage is converted to an output voltage by switching the high-side switch and the low-side switch on and off in a complementary manner; a feedback circuit, coupled to the switching circuit to receive the output voltage to generate a feedback signal; and a control circuit, configured to receive the feedback signal to generate a high-side control signal and a low-side control signal to respectively control the high-side switch and the low-side switch, and further configured to generate a noise-free current threshold based on the feedback signal, wherein when the switching frequency of the switching converter is decreased to a noise-free frequency threshold, the control circuit is configured to limit the switching frequency to the noise-free frequency threshold, and wherein when an inductor current signal flowing through the output inductor is reversely increased to the noise-free current threshold, the control circuit is configured to turn the low-side switch off.

Embodiments of the present invention are directed to a noise-free control method for a switching converter having a high-side switch and a low-side switch. The noise-free control method comprises: determining whether the switching frequency of the switching converter is decreased to a noise-free frequency threshold; limiting the switching frequency of the switching converter to the noise-free frequency threshold when the switching frequency of the switching converter is decreased to the noise-free frequency threshold; detecting an inductor current flowing through an output inductor of the switching converter; generating a noise-free current threshold based on a feedback signal of the switching converter; determining whether the inductor current signal is reversely increased to the noise-free current threshold; and turning the low-side switch off when the inductor current is reversely increased to the noise-free current threshold.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
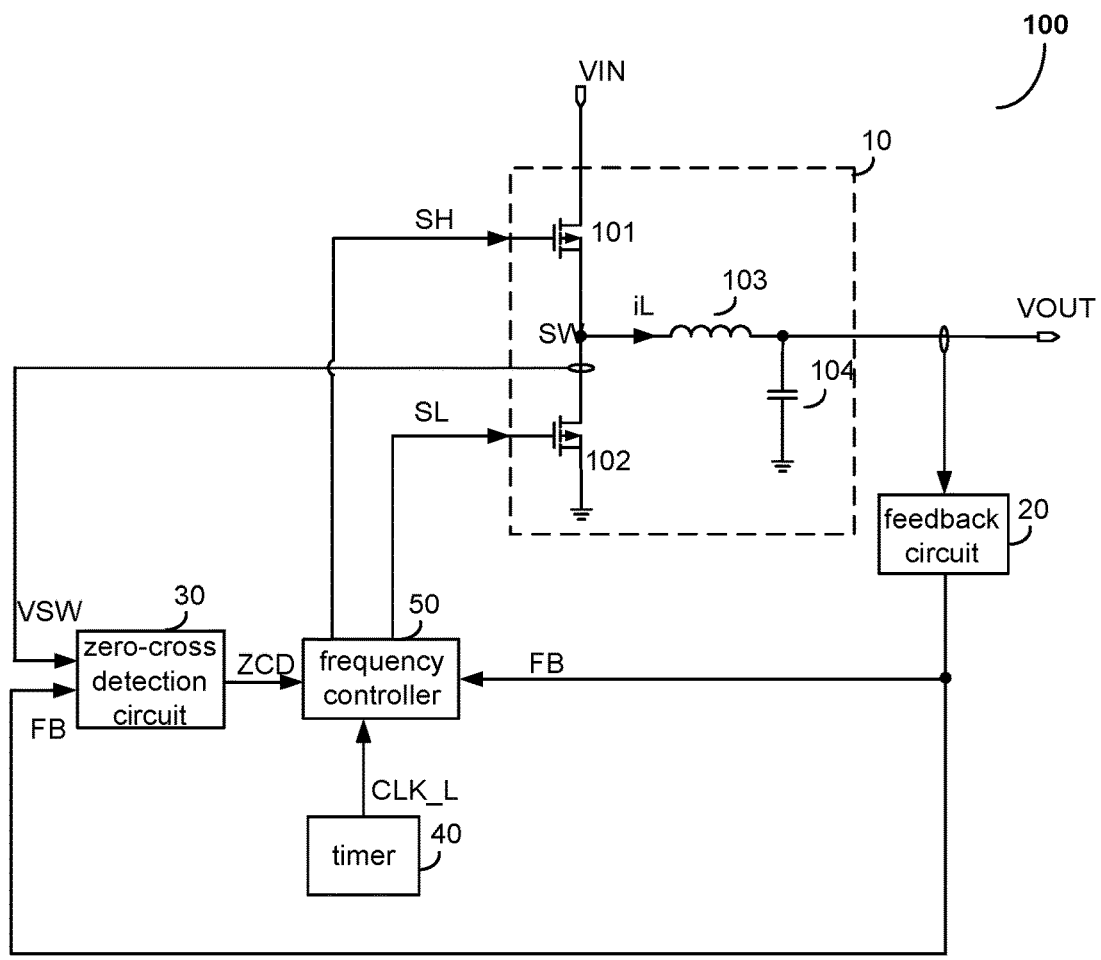
FIG. 1 schematically illustrates a noise-free switching converter 100 in accordance with an embodiment of the present invention.

FIG. 1 schematically illustrates a noise-free switching converter 100 in accordance with an embodiment of the present invention. As shown in FIG. 1, the noise-free switching converter 100 may comprise a switching circuit 10 and a control circuit comprising a feedback circuit 20, a zero-cross detection circuit 30, a timer 40 and a frequency controller 50.

In the exemplary embodiment of FIG. 1, the switching circuit 10 may be illustrated to have a BUCK topology comprising a high-side switch 101, a low-side switch 102, an output inductor 103 and an output capacitor 104, wherein the high-side switch 101 and the low-side switch 102 are illustrated as Metal Oxide Semiconductor Field Effect Transistors ("MOSFETs") in FIG. 1. Each of the high-side switch 101 and the low-side switch 102 has a source, a drain and a gate. The drain of the high-side switch 101 may be coupled to an input terminal of the noise-free switching converter 100 for receiving an input voltage VIN. The source of the high-side switch 101 may be coupled to the drain of the low-side switch 102 so as to constitute a common connection node SW. The source of the low-side switch 102 is connected to a logic ground. The output inductor 103 may be coupled between the common connection node SW and an output terminal of the noise-free switching converter 100. The output capacitor 104 may be connected between the output terminal of the noise-free switching converter 100 and the logic ground so as to provide an output voltage signal VOUT for a load.

The control circuit may be configured to generate a high-side control signal SH and a low-side control signal SL to respectively control the high-side switch 101 and the low-side switch 102 on and off in a complementary manner. The high-side control signal SH and the low-side control signal SL may be logic signals having an active state (e.g., logic high) and an inactive state (e.g., logic low). In an embodiment, when the high-side control signal SH is in the active state, the high-side switch is turned on, and when the high-side control signal SH is in the inactive state, the high-side switch is turned off. Similarly, when the low-side control signal SL is in the active state, the low-side switch is turned on, and when the low-side control signal SL is in the inactive state, the low-side switch is turned off. In an embodiment, the input voltage signal VIN may be converted to the output voltage signal VOUT by switching the high-side switch 101 and the low-side switch 102 on and off in a complementary manner.

As can be appreciated, whereas the high-side switch 101 and the low-side switch 102 are illustrated as MOSFETs in FIG. 1, in other embodiment, the high-side switch 101 and the low-side switch 102 may comprise other suitable semiconductor devices such as Junction Field Effect Transistors ("JFETs"), Insulated Gate Bipolar Translators ("IGBTs") etc. Likewise, though the switching circuit 10 is illustrated to have a BUCK topology in FIG. 1, in other embodiment, the switching circuit 10 may comprise other suitable topology, such as BOOST, FORWAD or FLYBACK topologies etc.

In the exemplary embodiment of FIG. 1, the feedback circuit 20 may be coupled to the output terminal of the switching circuit 10 to generate the feedback signal FB. The feedback signal FB may comprise a voltage feedback signal, a current feedback signal or both the voltage feedback signal and current feedback signal. In an embodiment, the voltage feedback signal may comprise an output voltage feedback signal, and the current feedback signal may comprise an inductor current feedback signal or a switching current feedback signal.

In the exemplary embodiment of FIG. 1, the zero-cross detection circuit 30 may be configured to sense an inductor current signal iL flowing through the output inductor 103. In FIG. 1, the zero-cross detection circuit 30 senses the inductor current signal iL by detecting a node voltage signal VSW on the common connection node SW. When the high-side switch 101 is turned on and the low-side switch 102 is turned off, the node voltage signal VSW is equal to VIN−iL*RDSON1, wherein RDSON1 is the ON resistance of the high-side switch 101. The node voltage signal VSW is decreased with the increase in the inductor current signal iL. When the high-side switch 101 is off and the low-side switch 102 is on, the value of the node voltage signal VSW is equal to −iL*RDSON2, wherein RDSON2 is the ON resistance of the low-side switch 102, and wherein the node voltage signal VSW is a negative value and is increased with decrease in the inductor current signal iL. If the inductor current signal iL decreases to zero and the low-side switch 102 keeps the on state, the output capacitor 104 may be discharged through the low-side switch 102 and the inductor current signal iL is reversed. Thus, the node voltage signal VSW can be indicative of the inductor current signal iL.

In the exemplary embodiment of FIG. 1, the zero-cross detection circuit 30 may further be configured to receive a feedback signal FB to generate a noise-free current threshold. Furthermore, the zero-cross detection circuit 30 may be configured to compare the inductor current signal iL with the noise-free current threshold to generate a zero-cross signal ZCD. In an embodiment, the zero-cross detection circuit 30 may comprise a first input terminal coupled to the common connection node SW to receive the node voltage signal VSW, a second input terminal configured to receive the feedback signal FB, and an output terminal. In the zero-cross detection circuit 30, the noise-free current threshold is converted to a noise-free voltage threshold. The zero-cross detection circuit 30 may further be configured to compare the node voltage signal VSW with the noise-free voltage threshold to generate the zero-cross signal ZCD at the output terminal of the zero-cross detection circuit 30.

The zero-cross signal ZCD may be used to turn the low-side switch 102 off once the node voltage signal VSW is equal to the noise-free voltage threshold. In the exemplary embodiment of FIG. 1, the noise-free voltage threshold is indicative of a maximum reverse value of the inductor current signal iL (i.e., the noise-free current threshold), rather than a traditional zero-cross value (e.g., 0V). The noise-free voltage threshold which determines the discharge time of the output capacitor 104 discharged through the low-side switch 102 is regulatable. The higher the noise-free voltage threshold, the longer the discharge time of the output capacitor 104.

In the exemplary embodiment of FIG. 1, the timer 40 may be configured to set a noise-free frequency threshold fTH. In an embodiment, the timer 40 is configured to generate a clock signal CLK_L having a frequency used as the noise-free frequency threshold fTH. In FIG. 1, the noise-free frequency threshold fTH is the minimum operation frequency of the noise-free switching converter 100. Generally, the noise-free frequency threshold fTH is greater than or equal to 20 kHZ. When the switching frequency of the noise-free switching converter 100 is decreased to the noise-free frequency threshold fTH, the clock signal CLK_L is configured to limit the switching frequency of the noise-free switching converter 100 to the noise-free frequency threshold fTH.

In the exemplary embodiment of FIG. 1, the frequency controller 50 may be configured to receive the feedback signal FB, the zero-cross signal ZCD and the clock signal CLK_L, and further configured to generate the high-side control signal SH and the low-side control signal SL based on the feedback signal FB, the zero-cross signal ZCD and the clock signal CLK_L.

In an embodiment, when the switching frequency of the noise-free switching converter 100 is higher than the noise-free frequency threshold fTH, the noise-free switching converter 100 may operate in a Pulse Frequency Modulation ("PFM") mode. The frequency controller 50 may be configured to regulate the output voltage VOUT through changing the frequency of the high-side control signal SH and the low-side control signal SL. For this condition, the frequency controller 50 may comprise a PFM control module, e.g., a Constant On Time ("COT") module. When the switching frequency of the noise-free switching converter 100 is decreased to the noise-free frequency threshold fTH, the clock signal CLK_L may be configured to limit the frequency of the high-side control signal SH and the frequency of the low-side control signal SL (i.e., the switching frequency of the noise-free switching converter 100) to the noise-free frequency threshold fTH.

In an embodiment, when the switching frequency of the noise-free switching converter 100 is higher than the noise-free frequency threshold fTH, the noise-free switching converter 100 may operate in a PFM mode and a Pulse Width Modulation ("PWM") mode. For example, when the noise-free switching converter 100 operates with the normal load, the frequency of the high-side control signal SH and the low-side control signal SL is constant. The frequency controller 50 may regulate the output voltage signal VOUT through changing the duration of the active state of the high-side control signal SH and the low-side control signal SL. For this condition, the frequency controller 50 may comprise a PWM module, e.g., a peak current control module. When the noise-free switching converter 100 operates with the light-load or no-load, the frequency controller 50 regulates the output voltage signal VOUT through changing the frequency of the high-side control signal SH and the low-side control signal SL. Therefore, for this situation, the frequency controller 50 may further comprise a PFM control module, e.g., a skip cycle control module.

In the exemplary of this disclosure, the minimum switching frequency of the noise-free switching converter 100 is limited to be higher than the maximum audible frequency of the audio noise that can be heard by human ear, i.e., 20 kHZ, thus the noise-free switching converter 100 disclosed in the present invention is noise-free. For this condition, however, the output voltage signal VOUT may rise to a higher value than a predetermined value of the output voltage signal VOUT, which is undesirable. In order to decrease the output voltage signal VOUT, the output voltage signal VOUT may be discharged through the low-side switch 102 when the switching frequency is limited to the noise-free frequency threshold fTH in the light-load or no-load condition.

Figure 2:
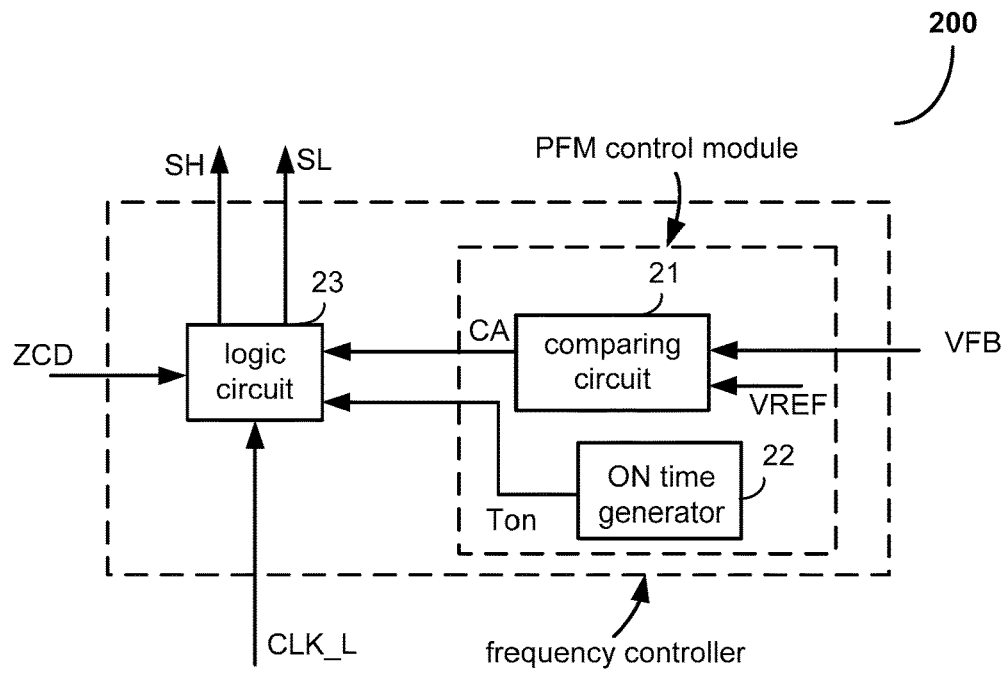
FIG. 2 schematically illustrates a frequency controller 200 in accordance with an embodiment of the present invention.

FIG. 2 schematically illustrates a frequency controller 200 in accordance with an embodiment of the present invention.

In the exemplary embodiment of FIG. 2, when the switching frequency of the noise-free switching converter 100 is higher than the noise-free frequency threshold fTH, the frequency controller 200 may control the noise-free switching converter 100 to operate in the PFM mode. The frequency controller 200 regulates the output voltage VOUT through regulating the switching frequency of the noise-free switching converter 100. Therefore, the frequency controller 200 may comprise a PFM control module which is illustrated as a COT control module in the exemplary embodiment of FIG. 2.

In the exemplary embodiment of FIG. 2, the frequency controller 200 may comprise a comparing circuit 21, an ON time generator 22 and a logic circuit 23.

In the exemplary embodiment of FIG. 2, the comparing circuit 21 may comprise a first input terminal configured to receive the voltage feedback signal VFB, a second input terminal configured to receive a reference voltage signal VREF, and an output terminal. The comparing circuit 21 may be configured to compare the voltage feedback signal VFB with the reference voltage signal VREF to generate a comparing signal CA at the output terminal.

In the exemplary embodiment of FIG. 2, the ON time generator 22 may be configured to generate a constant ON time signal Ton. In an embodiment, the comparing signal CA may be configured to turn the high-side switch 101 on once the voltage feedback signal VFB is smaller than the reference voltage signal VREF, and the constant ON time signal Ton may be configured to turn the high-side switch 101 off. In an embodiment, the ON time generator 22 may be replaced with an OFF time generator which is configured to generate a constant OFF time signal Toff. For this condition, the constant OFF time signal may be configured to turn the high-side switch 101 on, and the comparing signal CA may be configured to turn the high-side switch 101 off once the voltage feedback signal VFB is larger than the reference voltage signal VREF.

In the exemplary embodiment of FIG. 2, the logic circuit 23 may comprise a first input terminal configured to receive the comparing signal CA, a second input terminal configured to receive the constant ON time signal Ton, a third input terminal configured to receive the zero-cross signal ZCD, a fourth terminal configured to receive the clock signal CLK_L, a first output terminal and a second output terminal. The logic circuit 23 may be configured to conduct a logic operation to the comparing signal CA, the constant ON time signal Ton, the zero-cross signal ZCD and the clock signal CLK_L to generate the high-side control signal SH and the low-side control signal SL at the first output terminal and the second output terminal correspondingly.

In the exemplary embodiment of FIG. 2, when the switching frequency of the noise-free switching converter 100 is higher than the noise-free frequency threshold fTH, the frequency controller 200 may be configured to regulate the output voltage VOUT through changing the frequency of the high-side control signal SH and the low-side control signal SL. When the switching frequency of the noise-free switching converter 100 is decreased to the noise-free frequency threshold fTH, the frequency controller 200 may be configured to limit the frequency of the high-side control signal SH and the low-side control signal SL to the noise-free frequency threshold fTH based on the clock signal CLK_L. Meanwhile, the frequency controller 200 may further be configured to control the inductor current iL to be reversely increased through the low-side switch 102. The low-side control signal SL may turn the low-side switch 102 off once the zero-cross signal ZCD is in an active state, i.e., the inductor current signal iL is reversely increased to the maximum reverse value of the inductor current signal iL.

Figure 3:
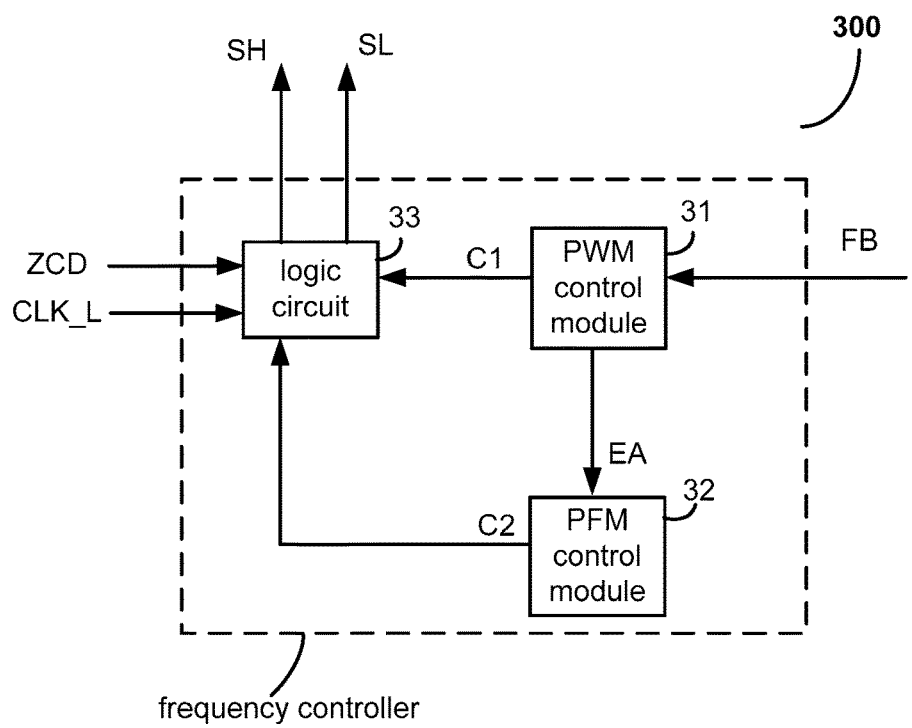
FIG. 3 schematically illustrates a frequency controller 300 in accordance with an embodiment of the present invention.

FIG. 3 schematically illustrates a frequency controller 300 in accordance with an embodiment of the present invention. In the exemplary embodiment of FIG. 3, the frequency controller 300 may comprise a PWM control module 31, a PFM control module 32 and a logic circuit 33. The PFM control module 32 may further comprise a light-load determining module which is configured to determine whether the noise-free switching converter 100 operates with the normal load. When the noise-free switching converter 100 operates with the normal load, the PWM control module 31 may operate to generate a first control signal C1 based on the voltage feedback signal VFB. The logic circuit 33 may be configured to generate the high-side control signal SH and the low-side control signal SL based on the first control signal C1. For this condition, the frequency of the high-side control signal SH and the low-side control signal SL is constant. When the noise-free switching converter 100 operates with the light load, the PFM control module 32 may operate to generate a second control signal C2 based on the error signal EA provided by the PWM control module 31. The logic circuit 33 may be configured to generate the high-side control signal SH and the low-side control signal SL based on the second control signal C2. For this condition, the frequency of the high-side control signal SH and the low-side control signal SL is variable.

In the exemplary embodiment of FIG. 3, the logic circuit 33 may comprise a first input terminal configured to receive the first control signal C1, a second input terminal configured to receive the second control signal C2, a third input terminal configured to receive the clock signal CLK_L, a fourth input terminal configured to receive the zero-cross signal ZCD, a first output terminal and a second output terminal. The logic circuit 33 may be configured to conduct a logic operation to the first control signal C1, the second control signal C2, the clock signal CLK_L and the zero-cross signal ZCD to generate the high-side control signal SH at the first output terminal and the low-side control signal SL at the second output terminal.

In the exemplary embodiment of FIG. 3, when the switching frequency of the noise-free switching converter 100 is higher than the noise-free frequency threshold fTH, both the PWM control module 31 and the PFM control module 32 may be operated to regulate the output voltage VOUT. When the switching frequency of the noise-free switching converter 100 is decreased to the noise-free frequency threshold fTH, the frequency controller 300 may be configured to limit the frequency of the high-side control signal SH and the low-side control signal SL to the noise-free frequency threshold fTH. Meanwhile, the frequency controller 300 may further be configured to control the inductor current iL to be reversely increased through the low-side switch 102. The low-side control signal SL may turn the low-side switch 102 off once the zero-cross signal ZCD is in the active state, i.e., the inductor current iL is reversely increased to the maximum reverse value of the inductor current signal iL.

Figure 4:
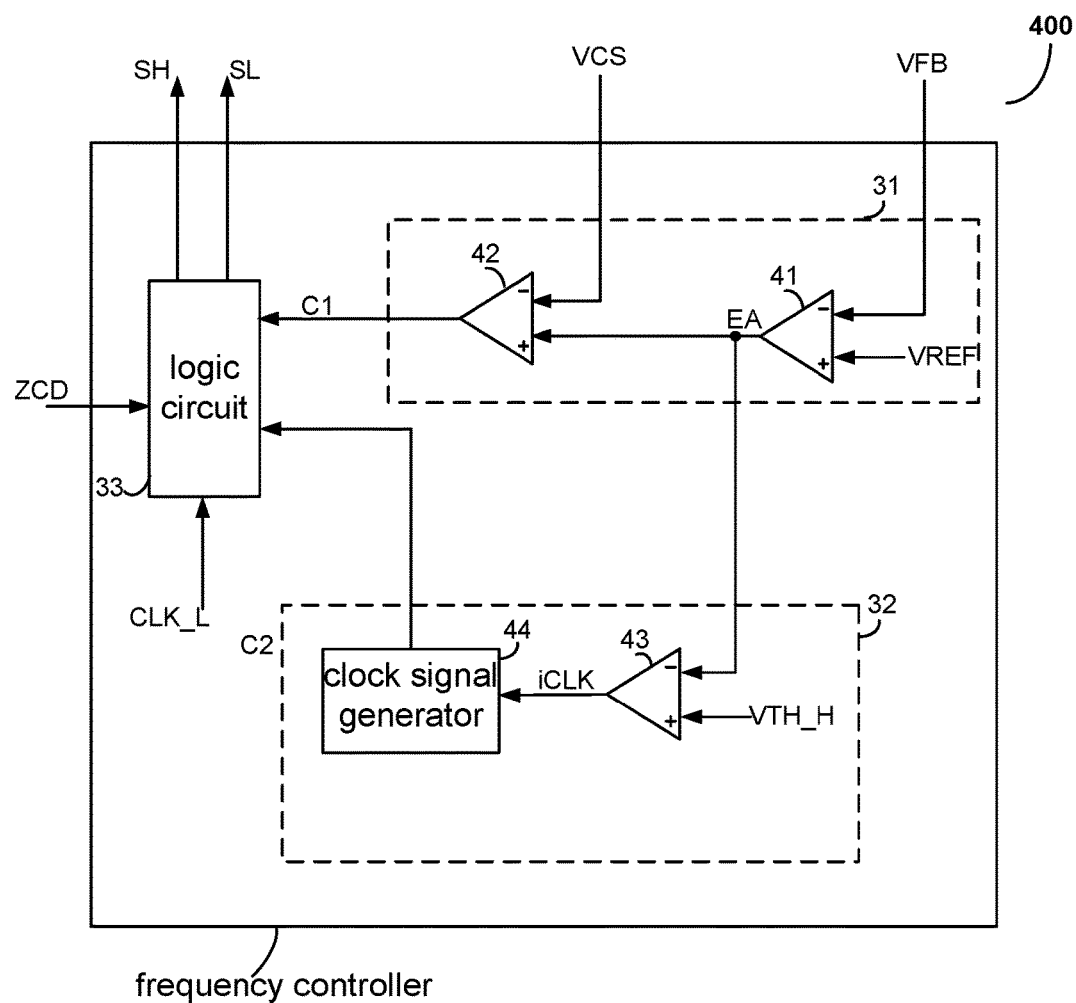
FIG. 4 schematically illustrates a frequency controller 400 in accordance with an embodiment of the present invention.

FIG. 4 schematically illustrates a frequency controller 400 in accordance with an embodiment of the present invention.

As shown in FIG. 4, the PWM control module 31 may comprise a voltage error amplifier 41 and a voltage comparator 42. The voltage error amplifier 41 may comprise a first input terminal configured to receive the voltage feedback signal VFB, a second input terminal configured to receive the reference voltage signal VREF, and an output terminal. The voltage error amplifier 41 may be configured to compare the voltage feedback signal VFB with the reference voltage signal VREF to generate the error signal EA at the output terminal of the voltage error amplifier 41. The error signal EA is indicative of a difference of the voltage feedback signal VFB and the reference voltage signal VREF. The voltage comparator 42 may comprise a first input terminal configured to receive a current sense signal VCS which is indicative of the inductor current signal iL, a second input terminal configured to receive the error signal EA, and an output terminal. The voltage comparator 42 may be configured to compare the voltage feedback signal VFB with the error signal EA to generate the first control signal C1.

The PFM control module 32 may comprise a transconductance amplifier 43 and a clock signal generator 44. The transconductance amplifier 43 may comprise a first input terminal configured to receive the error signal EA, a second input terminal configured to receive a light-load threshold VTH_H, and an output terminal. In an embodiment, the light-load threshold VTH_H is configured to determine whether the noise-free switching converter 100 is operated with the light-load or no load. For instance, when the error signal EA is smaller than the light-load threshold VTH_H, the noise-free switching converter 100 may be operated with the light-load or no load. The transconductance amplifier 43 may be configured to compare the error signal EA with the light-load threshold VTH_H to generate an error current signal iCLK at the output terminal of the transconductance amplifier 43. The clock signal generator 44 may be configured to receive the error current signal iCLK to generate the second control signal C2. In the exemplary embodiment of FIG. 4, the second control signal C2 may be operated as the initialization clock signal of the logic circuit 33, wherein the initialization clock signal is configured to setup the switching frequency of the noise-free switching converter 100.

When the error signal EA is higher than the light-load threshold VTH_H, the noise-free switching converter 100 may be operated with the normal load. For this condition, the error current signal ICLK may control the clock signal generator 44 to generate the second control signal C2 with a constant frequency which is much higher than the noise-free frequency threshold fTH. When the error signal EA is smaller than the light-load threshold VTH_H, the noise-free switching converter 100 may be operated with the light-load. For this condition, the error current signal iCLK may be configured to control the clock signal generator 44 to generate the second control signal C2 with a variation frequency, wherein the variation frequency is relevant to the value of the error current signal ICLK. For example, the smaller the error current signal iCLK, the lower the frequency of the second control signal C2. In an embodiment, the PFM control module 32 may further comprise a clamping module configured to clamp a minimum value of the error signal EA, which will be detailed description in the following embodiment of FIG. 7.

Figure 5:
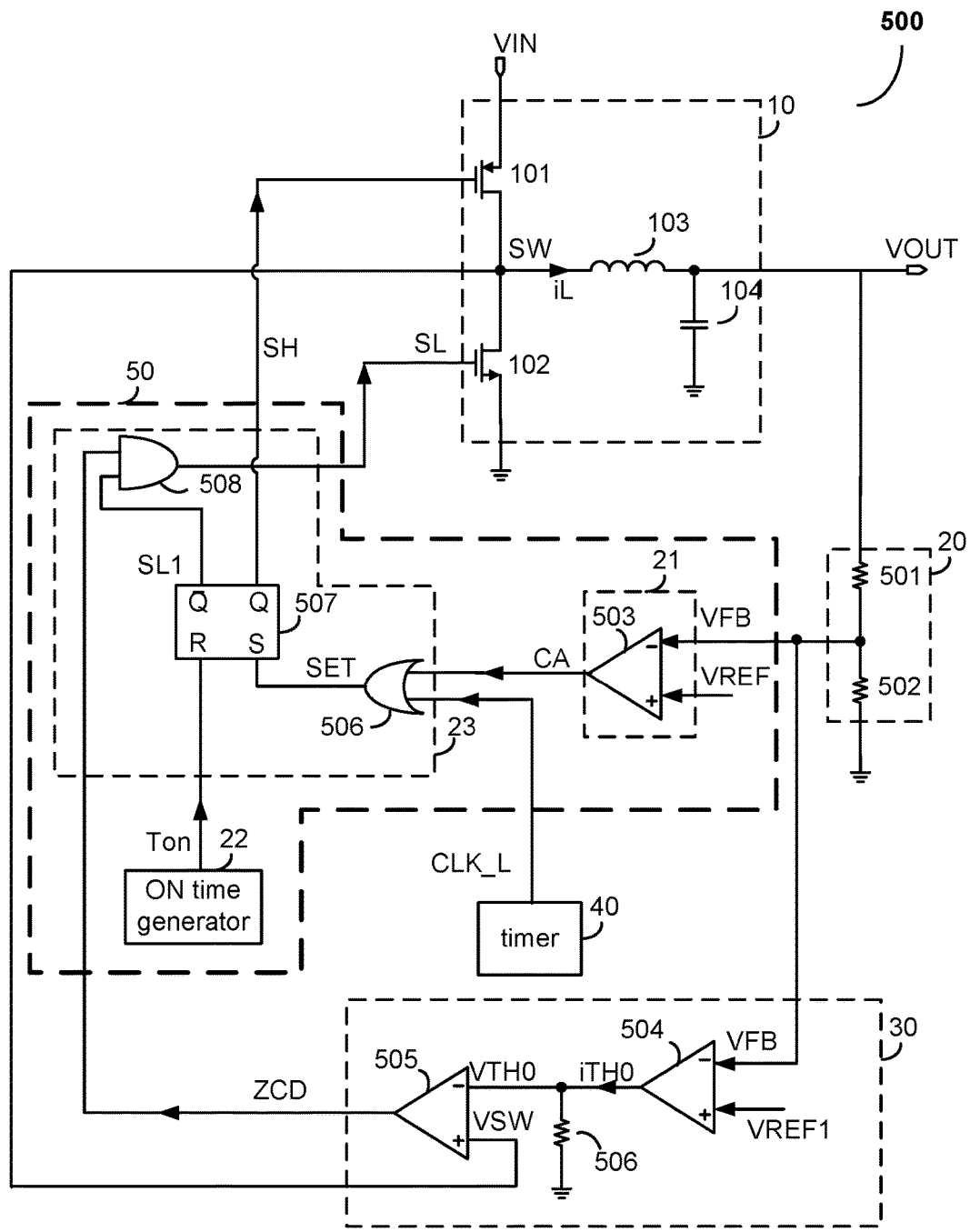
FIG. 5 schematically illustrates a noise-free switching converter 500 in accordance with an embodiment of the present invention.

FIG. 5 schematically illustrates a noise-free switching converter 500 in accordance with an embodiment of the present invention. Especially, in FIG. 5, the frequency controller 50 is schematically illustrated as an embodiment of FIG. 2.

In the exemplary embodiment of FIG. 5, the feedback circuit 20 is illustrated as a voltage divider including a first resistor 501 and a second resistor 502 which may be configured to generate the voltage feedback signal VFB.

In the exemplary embodiment of FIG. 5, the zero-cross detection circuit 30 may comprise a transconductance amplifier 504, a voltage comparator 505 and a resistor 506. The transconductance amplifier 504 may comprise a first input terminal configured to receive the voltage feedback signal VFB, a second input terminal configured to receive a first reference voltage signal VREF1, and an output terminal. The transconductance amplifier 504 may be configured to compare the voltage feedback signal VFB with the first reference voltage signal VREF1 to generate the noise-free current threshold iTH0 at the output terminal of the transconductance amplifier 504. The noise-free current threshold iTH0 is the maximum reverse value of the inductor current signal iL, rather than a traditional zero-cross current value (e.g., 0 A). In an embodiment, the noise-free current threshold iTH0 may be varied in accordance with the output voltage signal VOUT, and may determine how long the output capacitor 104 is discharged through the low-side switch 102. The higher the current threshold iTH0 is, the longer the output capacitor 104 is discharged through the low-side switch 102. The switching frequency of noise-free switching converter 500 may be prevented from decreasing below the noise-free frequency threshold fTH in order to avoid the audio noise during the light-load condition. Therefore, the real value of the output voltage signal VOUT is a little larger than the predetermined value of the output voltage signal VOUT after the switching frequency of noise-free switching converter 500 is limited to the noise-free frequency threshold fTH. For this condition, the first reference voltage signal VREF1 can be set to be a little larger than the reference voltage signal VREF which is proportional to the predetermined value of the output voltage signal VOUT. In an embodiment, VREF1=101% VREF. The resistor 506 may be coupled between the output terminal of the transconductance amplifier 504 and the logic ground for converting the noise-free current threshold iTH0 to a noise-free voltage threshold VTH0.

In an embodiment, the transconductance amplifier 504 and the resistor 506 may be replaced with a voltage error amplifier to directly generate the noise-free voltage threshold VTH0.

The voltage comparator 505 may comprise a first input terminal configured to receive the noise-free voltage threshold VTH0, a second input terminal configured to receive the node voltage signal VSW, and an output terminal. The voltage comparator 505 may configured to compare the noise-free voltage threshold VTH0 with the node voltage signal VSW to generate the zero-cross signal ZCD at the output terminal of the voltage comparator 505, wherein the zero-cross signal ZCD is a logic signal with a logic high state and a logic low state. The node voltage signal VSW is increased with the increase in the inductor current iL when the inductor current iL is reversely increased. In an embodiment, when node voltage signal VSW is increased to the noise-free voltage threshold VTH0 after the inductor current iL is reversely increased through the low-side switch 102, the zero-cross signal ZCD may be changed from the logic high state to the logic low state so as to turn the low-side switch 102 off.

In the exemplary embodiment of FIG. 5, the timer 40 is configured to generate the clock signal CLK_L whose frequency is equal to the noise-free frequency threshold fTH. In an embodiment, the timer 40 may comprise a 40 ms timer configured to generate the clock signal CLK_L with a 25 kHZ frequency. When the switching frequency of the noise-free switching converter 500 is decreased to 25 kHZ, the clock signal CLK_L may be configured to limit the frequency of the noise-free switching converter 500 to 25 kHZ.

In the exemplary embodiment of FIG. 5, the frequency controller 50 may comprise a comparing circuit 21, an ON time generator 22 and a logic circuit 23. The comparing circuit 21 and the ON time generator 22 are the same as those of the frequency controller 200 of FIG. 2, thus they will not be described in detail. Specifically, in FIG. 5, the comparing circuit 21 may be illustrated as a voltage comparator 503.

The logic circuit 23 may comprise an OR gate 506, a flip-flop 507 and an AND gate 508. The OR gate 506 may comprise a first input terminal configured to receive the comparing signal CA, a second input terminal configured to receive the clock signal CLK_L, and an output terminal. The OR gate 506 may be configured to conduct a logic operation to the comparing signal CA and the clock signal CLK_L to generate a setting signal SET at the output terminal. The flip-flop 507 may comprise a set terminal configured to receive the setting signal SET, a reset terminal configured to receive the constant ON time signal Ton generated by the ON time generator 22, a first output terminal coupled to the gate of the high-side switch 101 for providing the high-side control signal SH, and a second output terminal coupled to a first input terminal of the AND gate 508 for providing an intermediate control signal SL_1 which has a complementary logic state with the high-side control signal SH. A second input terminal of the AND gate 508 may be coupled to the output terminal of the comparing circuit 505 to receive the zero-cross signal ZCD. The AND gate 508 may be configured to conduct a logic operation to the intermediate control signal SL_1 and the zero-cross signal ZCD to generate the low-side control signal SL at the output terminal of the AND gate 508. The output terminal of the AND gate 508 may be coupled to the gate of the low-side switch 102 for providing the low-side control signal SL.

Figure 6:
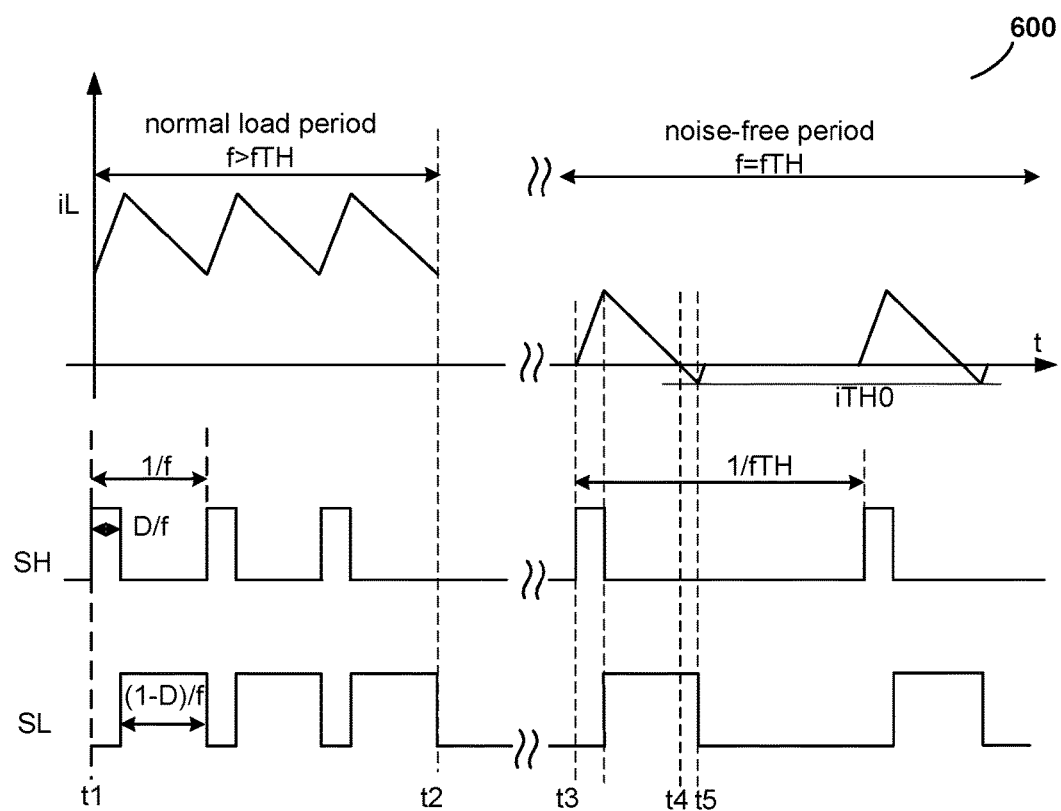
FIG. 6 illustrates an operation waveform diagram 600 illustrating operation of the noise-free switching converter 500 in accordance with an embodiment of the present invention.

FIG. 6 illustrates an operation waveform diagram 600 illustrating operation of the noise-free switching converter 500 in accordance with an embodiment of the present invention. As shown in FIG. 6, the diagram 600 illustrates the inductor current signal iL, the high-side control signal SH, and the low-side control signal SL from top-to-bottom. When the noise-free switching converter 500 operates with the normal load (from time t1 to t2), the switching frequency f of the noise-free switching converter 500 is higher than the noise-free frequency threshold fTH, and the inductor current signal iL is continuous. During this period, the duration of the logic high state of the high-side control signal SH is labeled as D/f, and the duration of the logic high state of the low-side control signal SL is labeled as (1−D)/f. When the noise-free switching converter 500 enters into the light-load mode, the switching frequency f of the noise-free switching converter 500 continues to decrease while the inductor current signal iL is discontinuous. When the switching frequency f decreases to the noise-free frequency threshold fTH (at time t3), the switching frequency f may be limited to the noise-free frequency threshold fTH. Comparing to a traditional switching converter, the switching converter 500 may not turn the low-side switch 102 off when the inductor current signal iL decreases to zero (at time t4). On the contrary, the low-side switch 102 may keep an ON state until the inductor current signal iL reversely increases to the noise-free current threshold iTH0 (at time t5).

Figure 7:
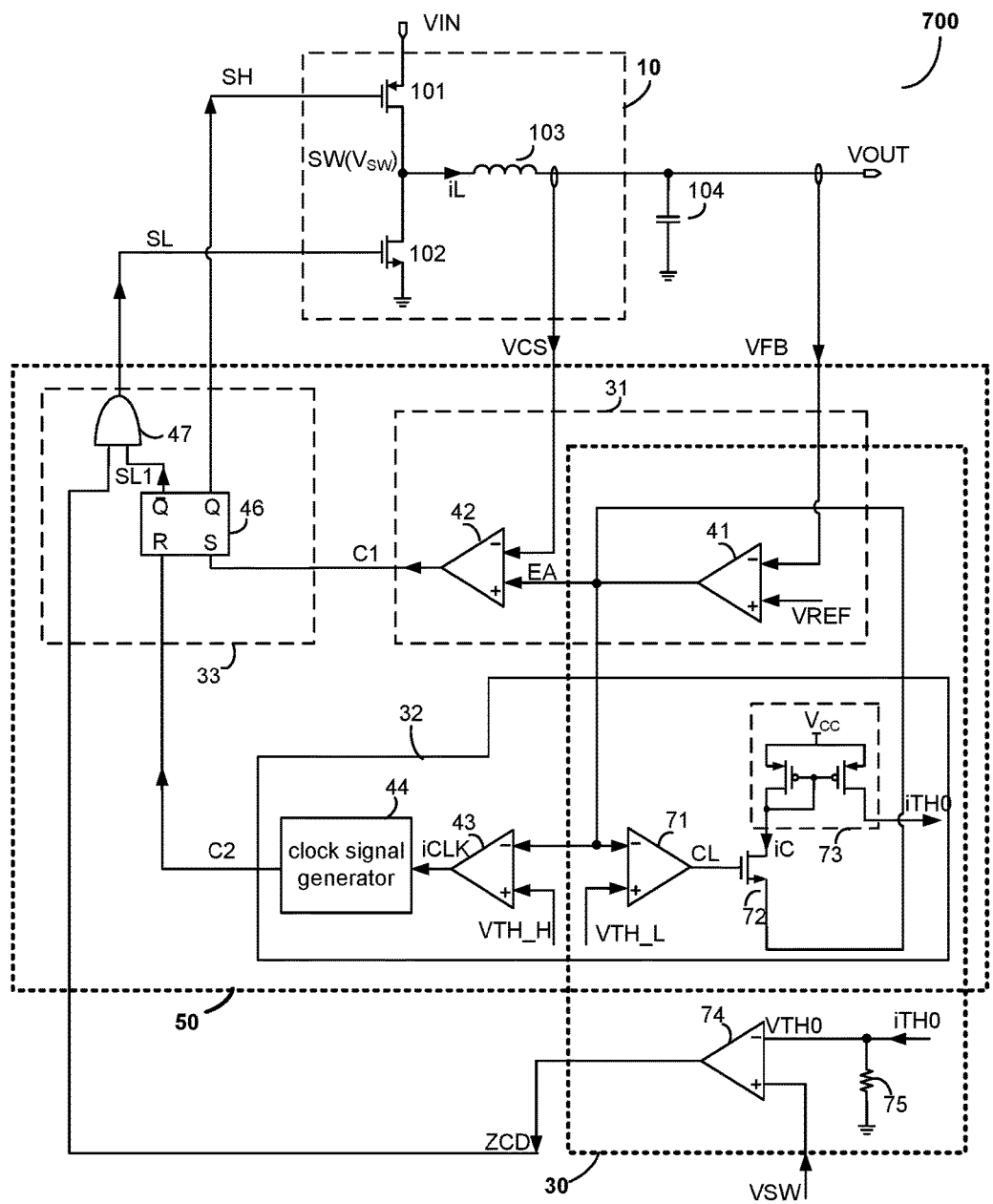
FIG. 7 schematically illustrates a noise-free switching converter 700 in accordance with an embodiment of the present invention.

FIG. 7 schematically illustrates a noise-free switching converter 700 in accordance with an embodiment of the present invention. Especially, in FIG. 7, the frequency controller 50 is illustrated in accordance with an embodiment of FIG. 3. In the exemplary embodiment of FIG. 5, the feedback circuit of the noise-free switching converter 500 may comprise a voltage feedback circuit and a current feedback circuit. The voltage feedback circuit may be configured to receive the output voltage signal VOUT to generate the voltage feedback signal VFB. The current feedback circuit may be configured to sense a current signal to generate the current sense signal VCS. With reference to the embodiment of FIG. 7, the current signal may comprise the inductor current signal iL. In another embodiment, the current signal may comprise other suitable current signals, e.g., a switching current signal flowing through the low-side switch 102.

In the exemplary embodiment of FIG. 7, the frequency controller 50 may comprise the PWM control module 31, the PFM control module 32 and the logic circuit 33. Since the PWM control module 31 is illustrated to be the same as that of FIG. 4, it will not be described in detail again. The PFM control module 32 not only comprises the transconductance amplifier 43 and the clock signal generator 44, but also further comprises a comparator 71, a switch 72 and a current mirror source 73. The comparator 71 may have a first input terminal configured to receive the error signal EA, a second input terminal configured to receive a light-load clamping signal VTH_L, and an output terminal. The comparator 71 may be configured to compare the error signal EA with the light-load clamping signal VTH_L to generate a clamping control signal CL. The switch 72 may have a first terminal coupled to the current mirror source 73, a second terminal coupled to the output terminal of the error amplifier 41, and a control terminal configured to receive the clamping signal CL. When the error signal EA decreases to the light-load clamping signal VTH_L, the clamping control signal CL may turn the switch 72. The current mirror source 73 may be configured to provide a clamping current signal iC once the switch 72 is turned on. Furthermore, the clamping current signal iC can also be provided as the noise-free current threshold iTH0.

In the exemplary embodiment of FIG. 7, the logic circuit 33 may comprise a flip-flop 46 and an AND gate 47. The flip-flop 46 may comprise a set terminal configured to receive the first control signal C1, a reset terminal configured to receive the second control signal, a first output terminal coupled to the gate of the high-side switch 101 for providing the high-side control signal SH, and a second output terminal coupled to a first input terminal of the AND gate 47 for providing the intermediate control signal SL_1 which has a complementary logic state with the high-side control signal SH. A second input terminal of the AND gate 47 may be configured to receive the zero-cross signal ZCD. The AND gate 47 may be configured to conduct a logic operation to the intermediate control signal SL_1 and the zero-cross signal ZCD to generate the low-side control signal SL at the output terminal of the AND gate 47. The output terminal of the AND gate 47 may be coupled to the gate of the low-side switch 102 for providing the low-side control signal SL.

Different from the noise-free switching converter 500 of FIG. 5, the noise-free switching converter 700 may be configured to omit the timer 40. When the error signal EA decreases to the light-load threshold VTH_H, the clock signal generator 44 may be configured to provide the second control signal C2 based on the error current signal iCLK. The second control signal C2 may have a same function as the clock signal CLK_L generated by the timer 40 of the noise-free switching converter 500. For this condition, the frequency of the second control signal C2 is constant and equal to the noise-free frequency threshold fTH. The frequency of the second control signal C2 can be regulated to be higher than or equal to 20 kHZ through regulating the clamping current signal iC so as to avoid the audio noise. In an embodiment, the frequency of the second control signal C2 may be set to 25 kHZ.

In the exemplary embodiment of FIG. 7, the zero-cross detection circuit 30 also comprises the elements of the error amplifier 41, the comparator 71, the switch 72 and the current mirror source 73 of the frequency controller 50. The elements of the error amplifier 41, the comparator 71, the switch 72 and the current mirror source 73 of the frequency controller 50 may be configured to generate noise-free current threshold iTH0. In addition, the zero-cross detection circuit 30 may further comprise a comparator 74 and a resistor 75. The comparator 74 may comprise a first input terminal configured to receive the noise-free voltage threshold VTH0, a second input terminal configured to receive the node voltage signal VSW, and an output terminal. The comparator 74 may be configured to compare the noise-free voltage threshold VTH0 with the node voltage signal VSW to generate the zero-cross signal ZCD at the output terminal of the comparator 74. The node voltage signal VSW is increased with the increase in the inductor current iL when the inductor current iL is reversely increased. In an embodiment, when the node voltage signal VSW is increased to the noise-free voltage threshold VTH0, the zero-cross signal ZCD may be changed from the logic high state to the logic low state so as to turn the low-side switch 102 off.

Figure 8:
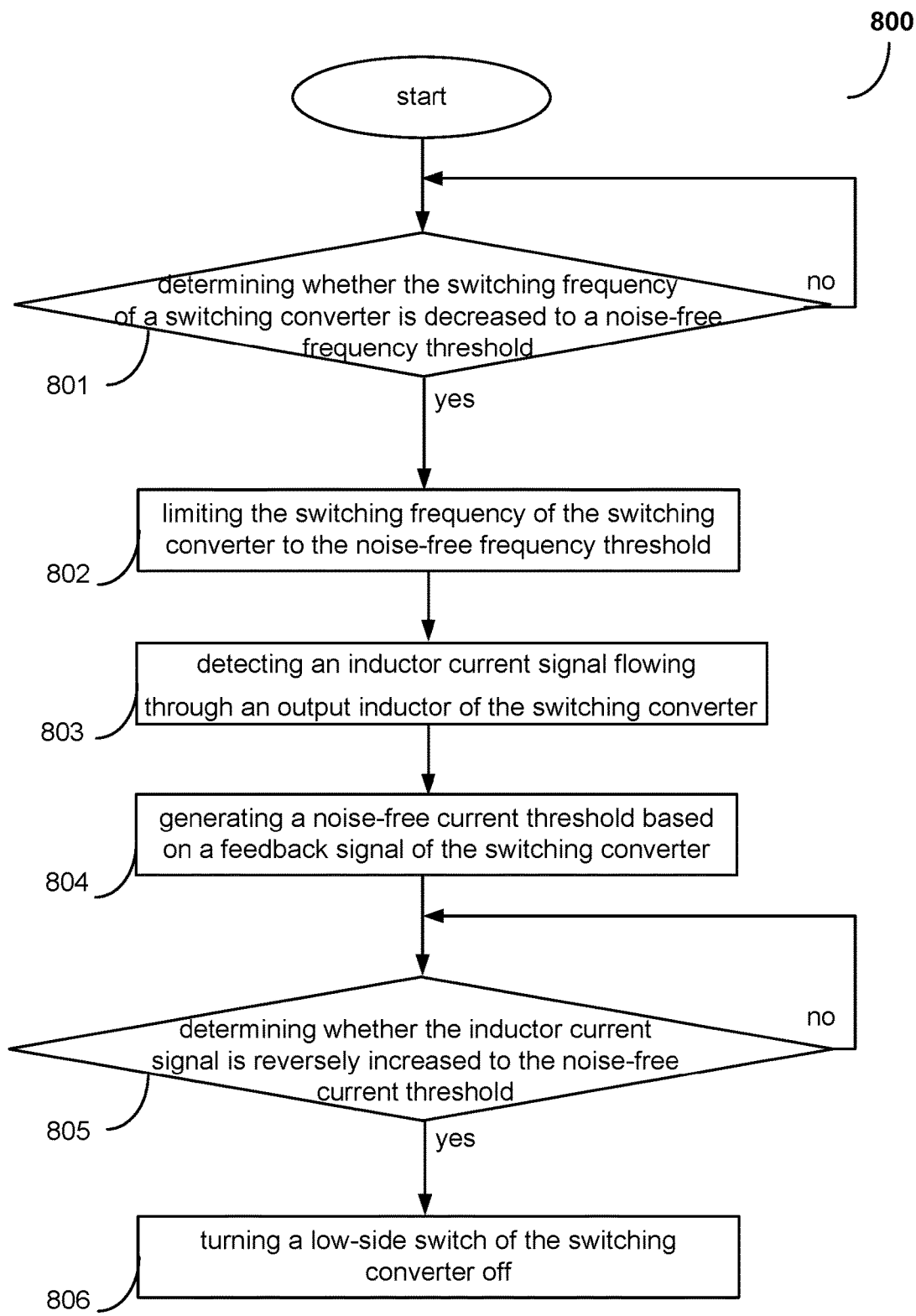
FIG. 8 illustrates a noise-free control method 800 for a noise-free switching converter in accordance with an embodiment of the present invention.

FIG. 8 illustrates a noise-free control method 800 for a noise-free switching converter in accordance with an embodiment of the present invention. The noise-free control method 800 can be carried out in the embodiments of this disclosure.

As mentioned above with reference to FIGS. 1-7, in an embodiment, when the switching frequency of a noise-free switching converter (e.g. noise-free switching converter 100) is higher than a noise-free frequency threshold (e.g., the noise-free frequency threshold fTH), the noise-free switching converter may operate in the PFM mode. The output voltage VOUT may be regulated through changing the frequency of the high-side control signal SH and the low-side control signal SL. When the frequency of the noise-free switching converter is decreased to the noise-free frequency threshold fTH, the frequency of the noise-free switching converter may be limited to the noise-free frequency threshold fTH.

In another embodiment, when the switching frequency of the noise-free switching converter 100 is higher than the noise-free frequency threshold fTH, the noise-free switching converter may operate in the PFM mode and the PWM mode. When the noise-free switching converter operates with a normal load, the frequency of the high-side control signal SH and the low-side control signal SL is constant, and the frequency controller may regulate the output voltage VOUT by changing the duration of the logic high state or the logic low state of the high-side control signal SH and the low-side control signal SL.

As shown in FIG. 8, the noise-free control method 800 may comprise steps 801-806.

In step 801, determining whether the switching frequency of the noise-free switching converter is decreased to the noise-free frequency threshold fTH. If the switching frequency of the noise-free switching converter is decreased to the noise-free frequency threshold fTH, turns to step 802, otherwise, continues with step 801.

In step 802, limiting the switching frequency of the noise-free switching converter to the noise-free frequency threshold fTH.

In step 803, detecting the inductor current iL flowing through the output inductor 103 of the noise-free switching converter. In an embodiment, detecting the inductor current iL may comprise detecting the node voltage signal VSW which is indicative of the inductor current iL.

In step 804, generating the noise-free current threshold iTH0 based on the feedback signal FB. In an embodiment, the feedback signal FB may comprise the voltage feedback signal VFB. Different from the traditional zero-cross signal, the noise-free current threshold iTH0 is indicative of a maximum reverse value of the inductor current iL. In an embodiment, the current noise-free threshold iTH0 may be varied in accordance with the output voltage signal VOUT, and may determine how long the output capacitor 104 is discharged through the low-side switch 102. The higher the noise-free current threshold iTH0 is, the longer the output capacitor 104 is discharged through the low-side switch 102.

In step 805, determining whether the inductor current signal iL is reversely increased to the noise-free current threshold iTH0. If the inductor current iL is reversely increased to the noise-free current threshold iTH0, turns to step 806. In an embodiment, the step 805 may comprise determining whether the node voltage signal VSW is reversely increased to the noise-free voltage threshold VTH0.

In step 806, turning the low-side switch 102 off.

It should be understood that in the exemplary embodiment of FIG. 8, the step 805 is arranged after the step 804, the step 804 is arranged after the step 803, and the step 803 is arranged after the step 802, but in another embodiment, the step 802, the step 803, the step 804 and the step 805 may actually be happened synchronously.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A noise-free control circuit for a switching converter having a high-side switch and a low-side switch, comprising:
    a timer, configured to generate a clock signal having a frequency used as a noise-free frequency threshold;
    a zero-cross detection circuit, configured to sense an inductor current signal flowing through an output inductor of the switching converter, and further configured to receive a feedback signal to generate a noise-free current threshold, and further configured to compare the inductor current signal with the noise-free current threshold to generate a zero-cross signal; and
    a frequency controller, configured to receive the feedback signal, the zero-cross signal and the clock signal to generate a high-side control signal and a low-side control signal to respectively control the high-side switch and the low-side switch on and off in a complementary manner, wherein when the switching frequency of the switching converter is decreased to the noise-free frequency threshold, the frequency controller is configured to limit the switching frequency to the noise-free frequency threshold based on the clock signal, and the noise-free current threshold is varied according to changes in the feedback signal, and wherein when the inductor current signal flows from the output of the switching converter through the low-side switch to the ground and the magnitude of the inductor current signal is increased to the magnitude of the noise-free current threshold, the frequency controller is configured to turn the low-side switch off based on the zero-cross signal.

2. The noise-free control circuit of claim 1, wherein the noise-free current threshold determines a discharge time of an output capacitor of the switching converter discharged through the low-side switch.

3. The noise-free control circuit of claim 1, wherein the feedback signal comprises a voltage feedback signal, and wherein the zero-cross detection circuit is configured to generate the noise-free current threshold based on the voltage feedback signal, and further configured to vary the noise-free current threshold according to changes in the voltage feedback signal.

4. The noise-free control circuit of claim 1, wherein the feedback signal comprises a voltage feedback signal, and wherein the frequency controller comprises:
    a voltage feedback comparator, configured to receive the voltage feedback signal and a first reference voltage signal, and further configured to compare the voltage feedback signal with the first reference voltage signal to generate a comparing signal;
    an ON time generator, configured to generate a constant ON time signal; and
    a logic circuit, configured to receive the comparing signal, the constant ON time signal, the zero-cross signal and the clock signal, and further configured to conduct a logic operation to the comparing signal, the constant ON time signal, the zero-cross signal and the clock signal to generate the high-side control signal and the low-side control signal.

5. The noise-free control circuit of claim 4, wherein the logic circuit comprises:
    an OR gate, configured to receive the comparing signal and the clock signal, and further configured to conduct a logic operation to the comparing signal and the clock signal to generate a setting signal;
    a flip-flop, having a set terminal configured to receive the setting signal, a reset terminal configured to receive the constant ON time signal, a first output terminal and a second output terminal, wherein the flip-flop is configured to conduct a logic operation to the setting signal and the constant ON time signal to generate the high-side control signal at the first output terminal, and an intermediate control signal at the second output terminal; and
    an AND gate, configured to receive the zero-cross signal and the third control signal, and further conduct a logic operation to the zero-cross signal and the third control signal to generate the low-side control signal.

6. The control circuit of claim 4, wherein the zero-cross detection circuit comprises:

a zero-cross amplifier, configured to receive the voltage feedback signal and a second reference voltage signal, and further configured to compare the voltage feedback signal with the second reference voltage signal to generate a noise-free voltage threshold, wherein the noise-free voltage threshold is indicative of the noise-free current threshold, and wherein the second reference voltage signal is higher than the first reference voltage signal; and a zero-cross comparator, configured to receive the noise-free voltage threshold and a node voltage signal, and further configured to compare the noise-free voltage threshold with the node voltage signal to generate the zero-cross signal, wherein the node voltage signal is indicative of a voltage on a common node of the high-side switch and the low-side switch.

7. The noise-free control circuit of claim 4, wherein the zero-cross detection circuit comprises:

a zero-cross transconductance amplifier, having a first input terminal configured to receive the voltage feedback signal, a second input terminal configured to receive a second reference voltage signal, and an output terminal, wherein the zero-cross transconductance amplifier is configured to compare the voltage feedback signal with the second reference voltage signal to generate the noise-free current threshold at the output terminal of the zero-cross transconductance amplifier, and wherein the second reference voltage signal is larger than the first reference voltage signal;

a zero-cross resistor, coupled between the output terminal of the zero-cross transconductance amplifier and a logic ground to convert the noise-free current threshold to a noise-free voltage threshold; and a zero-cross comparator, configured to receive the noise-free voltage threshold and a node voltage signal, and further configured to compare the noise-free voltage threshold with the node voltage signal to generate the zero-cross signal, wherein the node voltage signal is indicative of a voltage on a common node of the high-side switch and the low-side switch.

8. The noise-free control circuit of claim 1, wherein the frequency controller comprises:

a pulse width modulation control module, configured to receive the feedback signal to generate an error signal and a first control signal, wherein the first control signal has a constant frequency;

a pulse frequency modulation control module, configured to receive the error signal to generate a second control signal, wherein the second control signal has a variable frequency; and a logic circuit, configured to receive the first control signal, the second control signal, the clock signal and the zero-cross signal to generate the high-side control signal and the low-side control signal.

9. The noise-free control circuit of claim 8, wherein the feedback signal comprises a voltage feedback signal and a current feedback signal, and wherein the pulse width modulation control module comprises:

a voltage feedback amplifier, having a first input terminal configured to receive the voltage feedback signal, a second input terminal configured to receive a first reference voltage signal, and an output terminal, wherein the voltage feedback amplifier is configured to compare the voltage feedback signal with the first reference voltage signal to generate the error signal at the output terminal of the voltage feedback amplifier; and a current feedback comparator, configured to receive the error signal and the current feedback signal, and further configured to compare the error signal with the current feedback signal to generate the first control signal.

10. The noise-free control circuit of claim 9, wherein the pulse frequency modulation control module comprises:

a light-load transconductance amplifier, having a first input terminal coupled to the output terminal of the voltage feedback amplifier to receive the error signal, a second input terminal configured to receive a light-load threshold, and an output terminal, wherein the light-load transconductance amplifier is configured to compare the error signal with the light-load threshold to generate an error current signal at the output terminal of the light-load transconductance amplifier; and a clock generator, configured to receive the error current signal to generate the second control signal; and wherein when the error signal is higher than the light-load threshold, the second control signal has a first frequency which is constant; and wherein when the error signal is lower than the light-load threshold, the second control signal has a second frequency which is variable, and wherein the first frequency is higher than the second frequency.

11. The noise-free control circuit of claim 10, wherein the pulse frequency modulation control module further comprises:

a clamping comparator, having a first input terminal coupled to the output terminal of the voltage feedback amplifier to receive the error signal, a second input terminal configured to receive a light-load clamping signal, wherein the clamping comparator is configured to compare the error signal with the light-load clamping signal to generate a clamping control signal at the output terminal of the clamping comparator, wherein the light-load clamping signal is smaller than the light-load threshold;

a current mirror source, configured to generate a clamping current signal; and a clamping switch, having a first terminal coupled to the current mirror source, a second terminal coupled to the output terminal of the voltage feedback amplifier, and a control terminal configured to receive the clamping control signal, wherein when the error signal is decreased to the light-load clamping signal, the clamping control signal is configured to turn the clamping switch on; and wherein the timer is omitted, and the frequency controller is configured to generate the high-side control signal and the low-side control signal based on the feedback signal and the zero-cross signal.

12. The noise-free control circuit of claim 11, wherein the zero-cross detection circuit comprises:

a zero-cross resistor, coupled between the current mirror source and a logic ground to converter the clamping current signal to a noise-free voltage threshold; and a zero-cross comparator, configured to receive the noise-free voltage threshold and a node voltage signal, and configured to compare the noise-free voltage threshold with the node voltage signal to generate the zero-cross signal, wherein the node voltage signal is indicative of a voltage on a common node of the high-side switch and the low-side switch.

13. A noise-free switching converter, comprising:

a switching circuit, comprising a high-side switch, a low-side switch and an output inductor, wherein an input voltage signal is converted to an output voltage signal by switching the high-side switch and the low-side switch on and off in a complementary manner;

a feedback circuit, coupled to the switching circuit to receive the output voltage signal to generate a feedback signal; and a control circuit, configured to receive the feedback signal to generate a high-side control signal and a low-side control signal to respectively control the high-side switch and the low-side switch, and further configured to generate a noise-free current threshold based on the feedback signal, wherein the noise-free current threshold is varied according to changes in the feedback signal, and wherein when the switching frequency of the switching converter is decreased to a noise-free frequency threshold, the control circuit is configured to limit the switching frequency to the noise-free frequency threshold, and wherein when an inductor current signal flows from the output of the switching converter through the low-side switch to the ground and the magnitude of the inductor current signal is increased to the magnitude of the noise-free current threshold, the control circuit is configured to turn the low-side switch off.

14. A noise-free control method for a switching converter having a high-side switch and a low-side switch, comprising:

determining whether the switching frequency of the switching converter is decreased to a noise-free frequency threshold;

limiting the switching frequency of the switching converter to the noise-free frequency threshold when the switching frequency of the switching converter is decreased to the noise-free frequency threshold;

detecting an inductor current signal flowing through an output inductor of the switching converter;

generating a noise-free current threshold based on a feedback signal of the switching converter, wherein the noise-free current threshold is varied according to changes in the feedback signal;

determining whether the inductor current signal is reversely increased to the noise-free current threshold; and turning the low-side switch off when the inductor current signal flows from the output of the switching converter through the low-side switch to the ground and the magnitude of the inductor current signal is increased to the magnitude of the noise-free current threshold.

15. The noise-free control method of claim 14, wherein the noise-free current threshold determines a discharge time of an output capacitor of the switching converter discharged through the low-side switch.

16. The noise-free control method of claim 14, wherein the feedback signal comprises a voltage feedback signal, and wherein the zero-cross detection circuit is configured to generate the noise-free current threshold based on the voltage feedback signal and further configured to vary the noise-free current threshold according to changes in the voltage feedback signal.

* * * * *